(12) United States Patent
Igarashi

(10) Patent No.: US 12,294,792 B2
(45) Date of Patent: May 6, 2025

(54) PHOTOELECTRIC CONVERSION DEVICE HAVING PHOTOELECTRIC CONVERSION CIRCUIT RESPONSIVE TO INCIDENCE OF PHOTON, IMAGE CAPTURING DEVICE, CONTROL METHOD, AND STORAGE MEDIUM

(71) Applicant: CANON KABUSHIKI KAISHA, Tokyo (JP)

(72) Inventor: Kenta Igarashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 305 days.

(21) Appl. No.: 17/933,337

(22) Filed: Sep. 19, 2022

(65) Prior Publication Data

US 2023/0109506 A1 Apr. 6, 2023

(30) Foreign Application Priority Data

Sep. 24, 2021 (JP) .................................. 2021-155377

(51) Int. Cl.
*H04N 25/62* (2023.01)
*H04N 25/50* (2023.01)

(52) U.S. Cl.
CPC ............. *H04N 25/62* (2023.01); *H04N 25/50* (2023.01)

(58) Field of Classification Search
CPC ....... H04N 25/62; H04N 25/50; H04N 25/773
See application file for complete search history.

(56) References Cited

U.S. PATENT DOCUMENTS

2015/0163429 A1 6/2015 Dai

*Primary Examiner* — Chiawei Chen
*Assistant Examiner* — Angel L Garces-Rivera
(74) *Attorney, Agent, or Firm* — Canon U.S.A., Inc. IP Division

(57) ABSTRACT

A photoelectric conversion device has a pixel including a photoelectric conversion circuit configured to output a signal in response to incidence of a photon. The photoelectric conversion device includes a first measurement circuit, a second measurement circuit, and a change circuit. The first measurement circuit is configured to measure the signal output from the pixel. The second measurement circuit is configured to measure a time from when the first measurement circuit starts to measure the signal until when a measurement value of the first measurement circuit reaches a first threshold. The change circuit is configured to change, for at least one of a plurality of the pixels, an upper measurement limit value up to which the signal is countable.

16 Claims, 10 Drawing Sheets

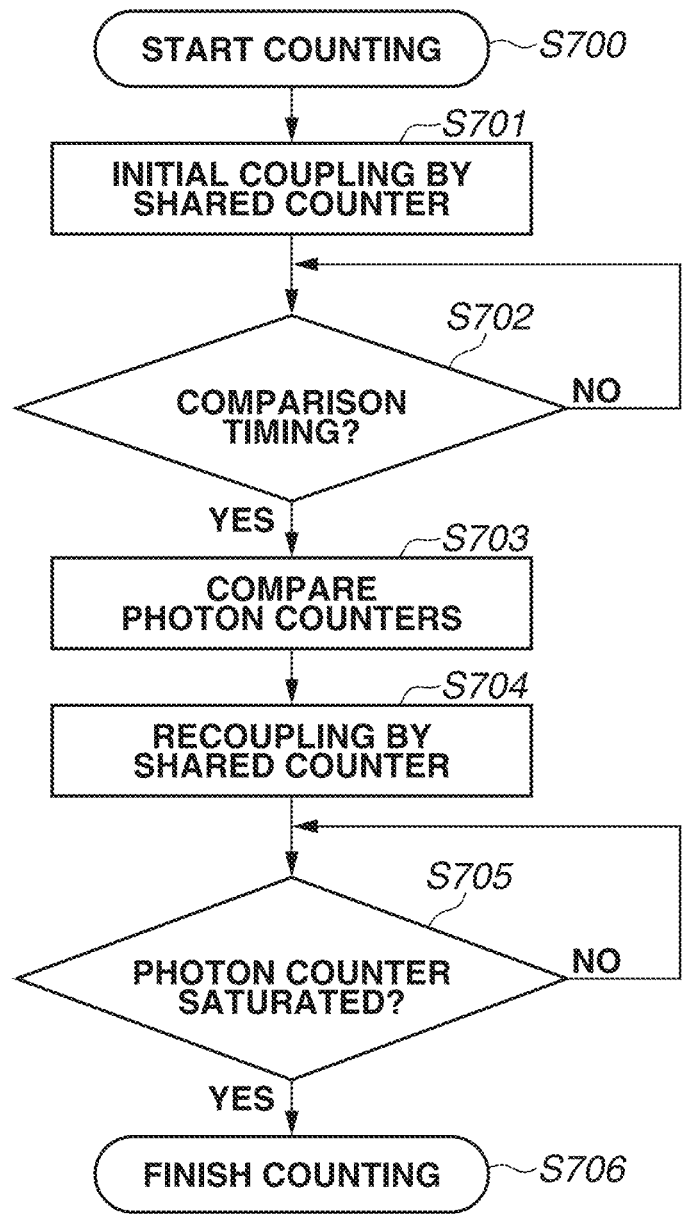

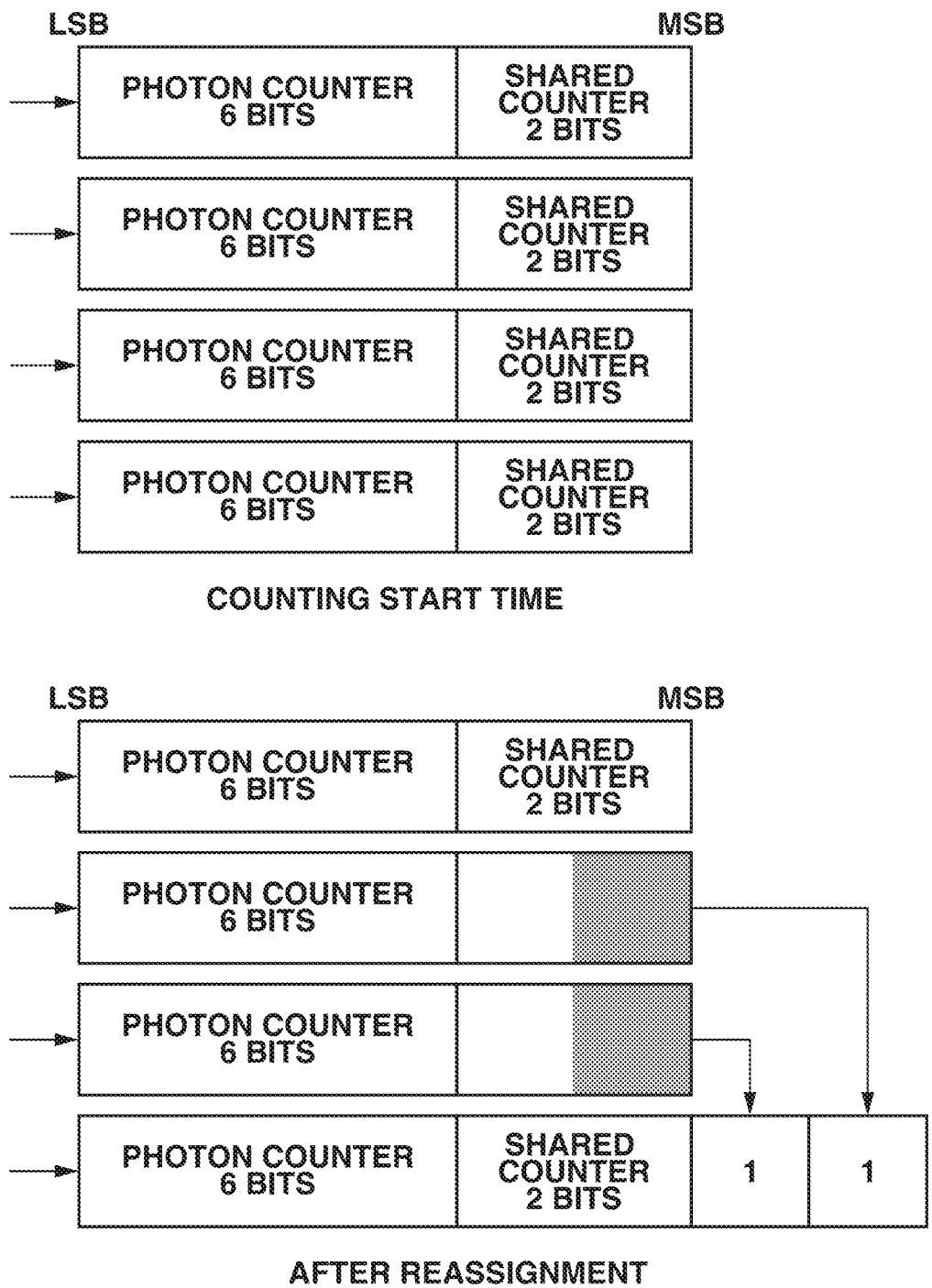

PHOTOELECTRIC CONVERSION DEVICE HAVING PHOTOELECTRIC CONVERSION CIRCUIT RESPONSIVE TO INCIDENCE OF PHOTON, IMAGE CAPTURING DEVICE, CONTROL METHOD, AND STORAGE MEDIUM

BACKGROUND

Technical Field

One disclosed aspect of the embodiments relates to a photoelectric conversion device including a photoelectric conversion circuit that outputs a signal in response to an incident photon.

Description of the Related Art

Photoelectric conversion devices having been recently discussed include a photoelectric conversion device that digitally counts the number of photons incident on an avalanche photodiode and outputs, from a pixel, the count value as a photoelectrically converted digital signal.

United States Patent Application Publication No. 2015/0163429 discussing a structure having a time counter is provided to measure the time in addition to a photon counter that counts photons. The time counter measures a time from when measurement of the photon counter is started until when the number of photons reaches a predetermined value, and calculates a pixel value from the measured time.

According to United States Patent Application Publication No. 2015/0163429, the photon counter and the time counter are provided for each pixel, which results in an increase in circuit size.

SUMMARY

The disclosure has been made in view of the above-described issue and is directed to providing a technique for desirable pixel readout processing while suppressing or reducing an increase in circuit size.

According to an aspect of the disclosure, a photoelectric conversion device or circuit assembly having a pixel including a photoelectric conversion circuit is configured to output a signal in response to incidence of a photon. The photoelectric conversion device includes a first measurement circuit, a second measurement circuit, and a change circuit. The first measurement circuit is configured to measure the signal output from the pixel. The second measurement circuit is configured to measure a time from when the first measurement circuit starts to measure the signal until when a measurement value of the first measurement circuit reaches a first threshold. The change circuit is configured to change, for at least one of a plurality of the pixels, an upper measurement limit value up to which the signal is countable.

Further features of the disclosure will become apparent from the following description of exemplary embodiments with reference to the attached drawings. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing circuit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above.

BRIEF DESCRIPTION OF THE DRAWINGS

FIG. 7 is a flowchart illustrating an example of an operation of the photoelectric conversion device.

FIG. 9 is a schematic diagram illustrating an example of a counting method of a photon counter.

DESCRIPTION OF THE EMBODIMENTS

An exemplary embodiment for carrying out the disclosure will be described below in detail. The exemplary embodiment described below is an example for implementing the disclosure and can be corrected or changed as appropriate depending on the configuration and various conditions of the device to which the disclosure is applied, and the disclosure is not limited to the exemplary embodiment below. In all figures, the components having the same function are denoted by the same number, and the redundant description is omitted.

Before descriptions of detailed configurations of the present disclosure, a configuration of a photoelectric conversion device according to a first exemplary embodiment will be described.

Figure 1:
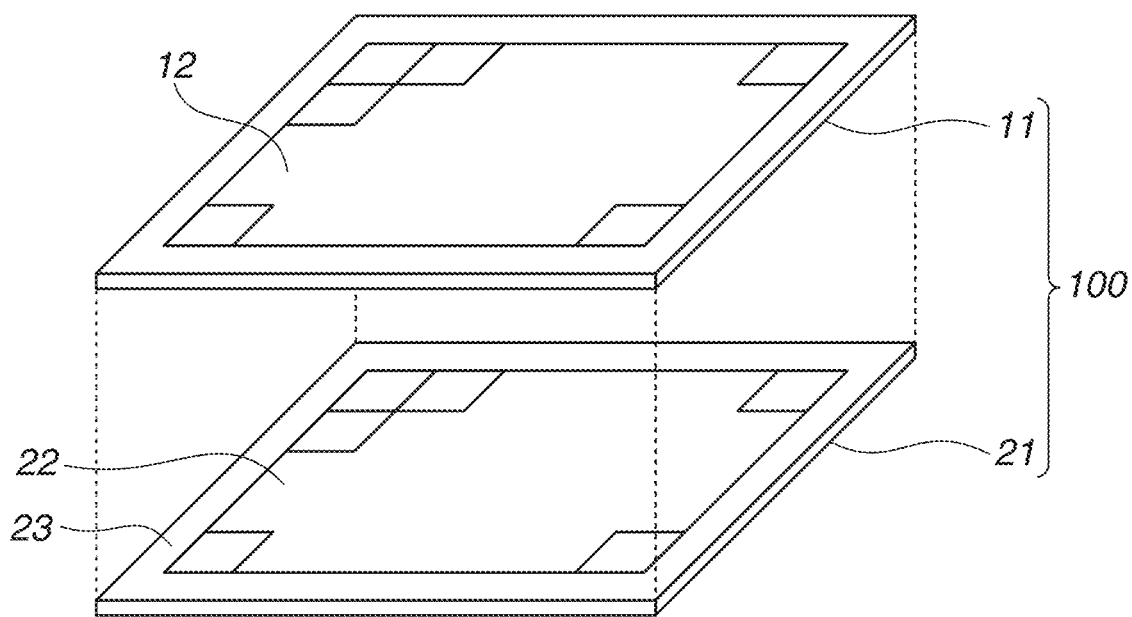
FIG. 1 is a diagram illustrating a hardware configuration example of a photoelectric conversion device.

FIG. 1 is a diagram illustrating a configuration example of a photoelectric conversion device 100 according to the present exemplary embodiment. The photoelectric conversion device 100 has a configuration in which two chips, a sensor chip 11 and a circuit chip 21, are laminated and are electrically coupled. The sensor chip 11 includes a pixel area 12 including a plurality of pixels. The circuit chip 21 includes a pixel circuit area 22 in which signals detected by the respective pixels in the pixel area 12 are processed in parallel and a peripheral circuit area 23 that reads out signals from the pixel circuit area 22.

Figure 2:
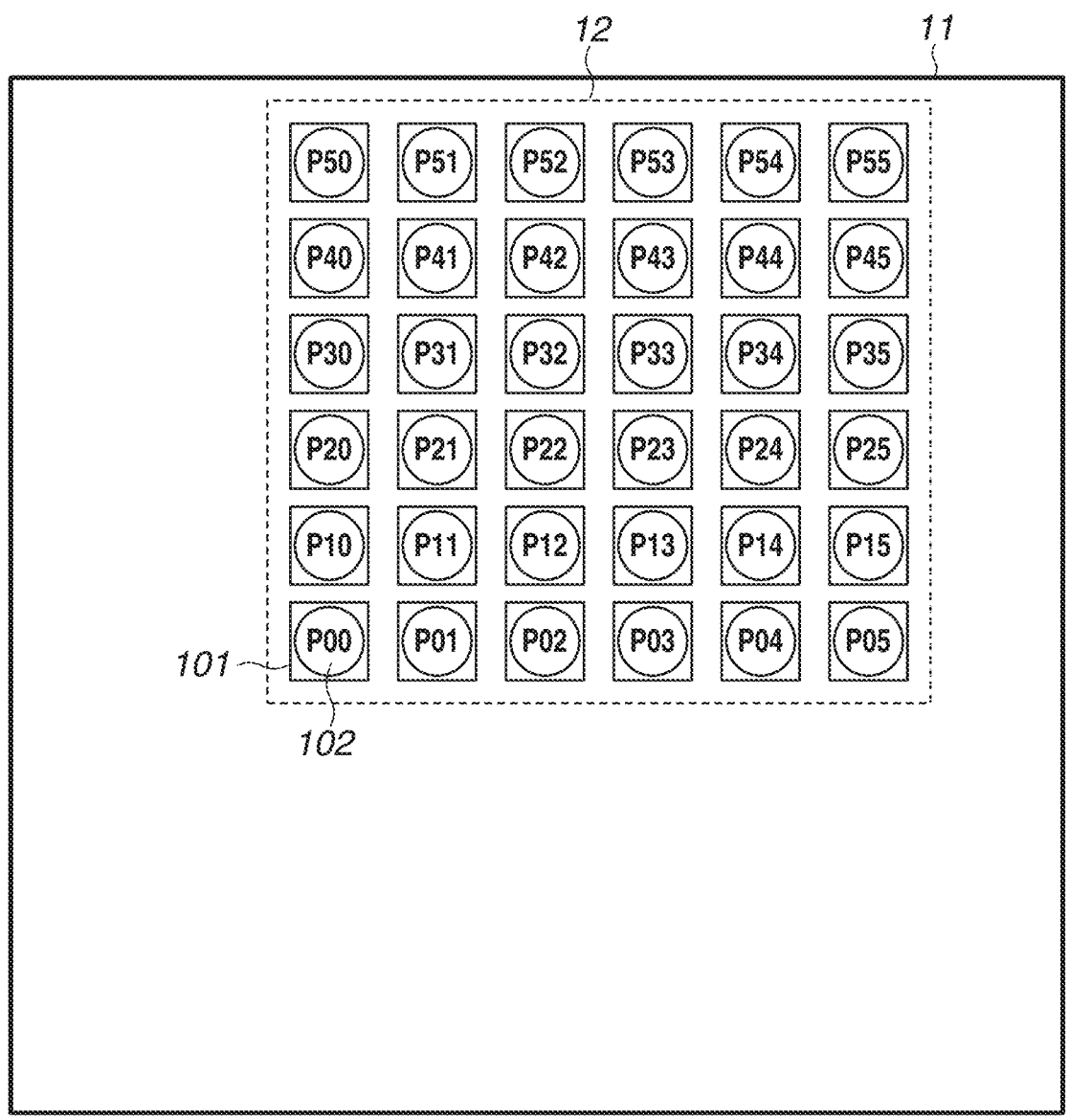
FIG. 2 is a diagram illustrating an example of a sensor chip of the photoelectric conversion device.

FIG. 2 is a diagram illustrating a configuration example of the sensor chip 11. The pixel area 12 of the sensor chip 11 includes a plurality of pixels 101 arranged in two dimensions in directions of a plurality of rows and columns. The pixel 101 includes a photoelectric conversion unit or circuit 102 including an avalanche photodiode (APD) that outputs a signal in response to an incident photon. FIG. 2 illustrates 36 pieces of the pixels 101 arranged in six rows from a zeroth row to a fifth row and in six columns from a zeroth column to a fifth column together with reference marks each indicating the row and column number. For example, among the pixels 101, the circuit in the first row and the fourth column is denoted by a reference mark "P14". The number of rows and columns of the pixel array forming the pixel area 12 is not particularly limited to the above-described configuration.

Figure 3:
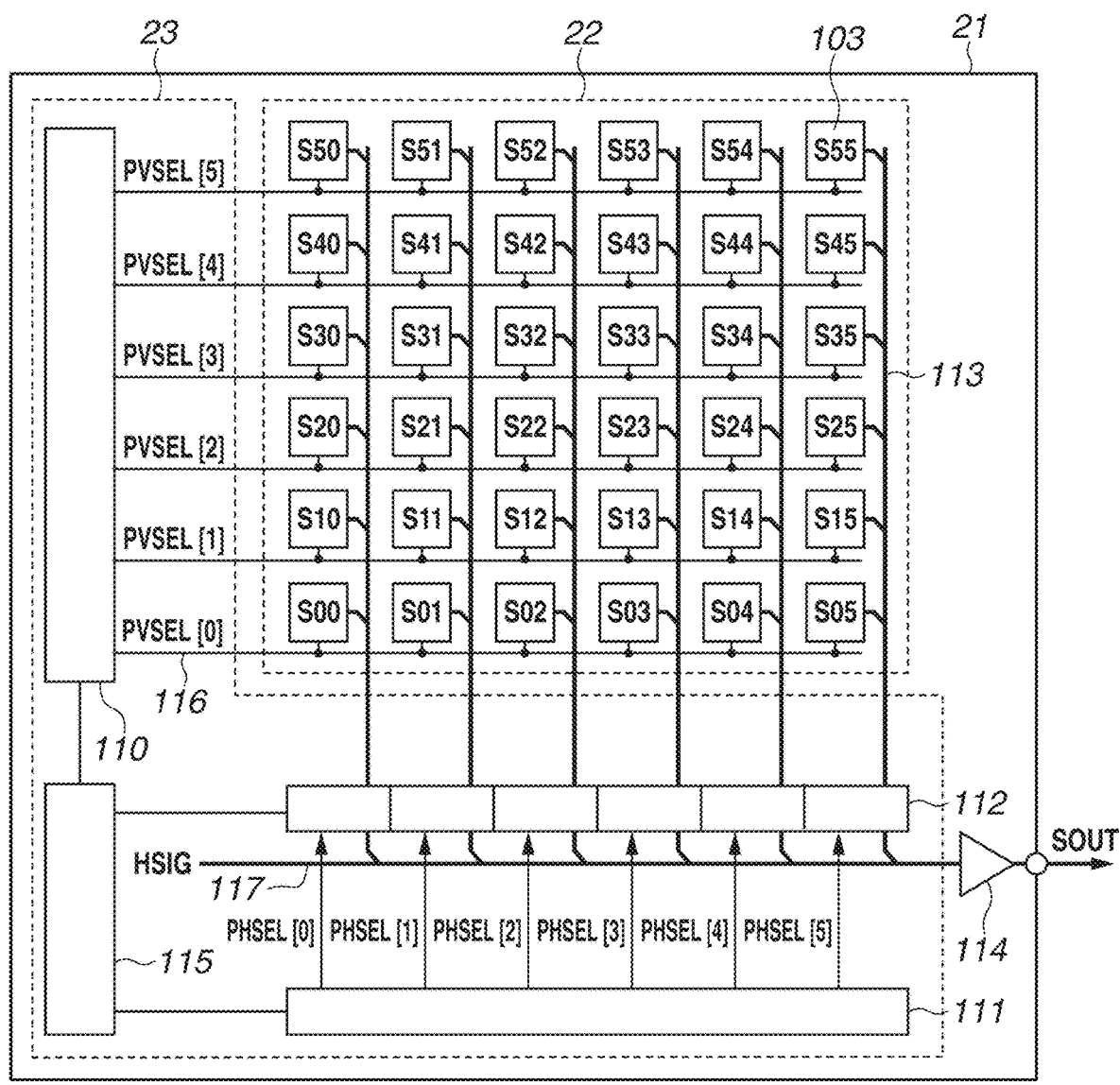
FIG. 3 is a diagram illustrating an example of a circuit chip of the photoelectric conversion device.

FIG. 3 is a diagram illustrating a configuration example of the circuit chip 21. The circuit chip 21 includes the pixel circuit area 22 and the peripheral circuit area 23.

The pixel circuit area 22 includes a plurality of signal processing circuits 103 arranged in two dimensions in directions of a plurality of rows and columns. FIG. 3 illustrates 36 pieces of the signal processing circuits 103 arranged in six rows from a zeroth row to a fifth row and in six columns from a zeroth column to a fifth column together with reference marks each indicating the row and column number. For example, the signal processing circuit 103 in the first row and the fourth column is denoted by a reference mark "S14". The number of rows and columns of the signal processing circuit array forming the pixel circuit area 22 is not particularly limited.

The peripheral circuit area 23 includes a vertical scanning circuit 110, a column circuit 112, a horizontal scanning circuit 111, a control pulse generation unit or circuit 115, and a signal output circuit 114. In each row of the signal processing circuit array in the pixel circuit area 22, a vertical selection line (VSEL) 116 extends in a first direction (a horizontal direction in FIG. 3). The vertical selection line 116 is coupled to each of the signal processing circuits 103 arranged in the first direction to form a signal line. The first direction in which the vertical selection line 116 extends may be referred to as a row direction or a horizontal direction. FIG. 3 illustrates the vertical selection line 116 together with a reference mark indicating the row number. For example, the vertical selection line 116 on the first row is denoted by a reference mark "PVSEL [1]". The vertical selection line 116 in each row is coupled to the vertical scanning circuit 110. The vertical scanning circuit 110 supplies a vertical selection signal for selectively driving the signal processing circuit 103, to the signal processing circuit 103 via the vertical selection line 116. According to the present exemplary embodiment, the vertical selection line 116 is divided into a read-out vertical selection line 214 for reading out signals of the plurality of signal processing circuits 103 in the respective rows and a reset vertical selection line 213 for resetting signals of the plurality of signal processing circuits 103 in the respective rows.

In each column of the signal processing circuit array in the pixel circuit area 22, a vertical signal line 113 extends in a second direction (a vertical direction in FIG. 3) that intersects with the first direction. The vertical signal line 113 is coupled to each of the signal processing circuits 103 arranged in the second direction to form a common signal line. The second direction in which the vertical signal line 113 extends may be referred to as a column direction or a vertical direction. FIG. 3 illustrates the vertical signal line 113 together with the reference mark indicating the column number. Each of the vertical signal lines 113 in the respective columns includes n signal lines for outputting n-bit digital signals.

The vertical signal line 113 is coupled to the column circuit 112. The column circuit 112 is provided to each column of the signal processing circuit array in the pixel circuit area 22 and is coupled to the vertical signal line 113 in the corresponding column. The column circuit 112 has a function of storing the signal read out from the signal processing circuit 103 via the vertical signal line 113 in the corresponding column.

The horizontal scanning circuit 111 supplies, to the column circuit 112, a horizontal selection signal for reading out of the signal from the column circuit 112. The horizontal scanning circuit 111 supplies a horizontal selection signal to the column circuit 112 in each column via a horizontal selection line (PHSEL). After receiving the horizontal selection signal from the horizontal scanning circuit 111, the column circuit 112 sequentially outputs stored signals to the signal output circuit 114 via a horizontal output line HSIG 117. FIG. 3 illustrates the horizontal selection line together with a reference mark indicating the column number. For example, the horizontal selection line in the fourth column is denoted by a reference mark "PHSEL [4]". The horizontal output line HSIG 117 includes n signal lines for outputting n-bit digital signals.

The signal output circuit 114 outputs a signal corresponding to a pixel signal as an output signal SOUT of the photoelectric conversion device 100.

The control pulse generation circuit 115 supplies control pulse signals for control of operation of the vertical scanning circuit 110, the horizontal scanning circuit 111, and the column circuit 112, and control of a timing of the operation. At least a part of the control pulse signals for control of the operation of the vertical scanning circuit 110, the horizontal scanning circuit 111, and the column circuit 112, and control of the timing of the operation can be supplied from outside the photoelectric conversion device 100.

Figure 4:
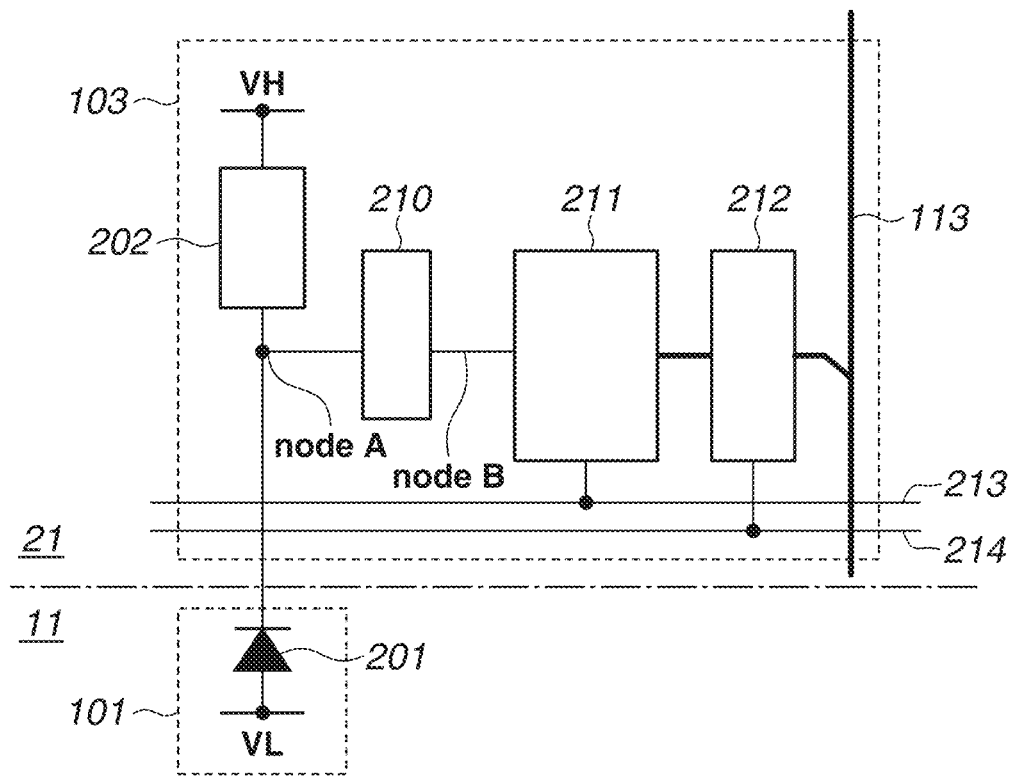
FIG. 4 is a diagram illustrating an example of an equivalent circuit of a pixel and a signal processing circuit in the photoelectric conversion device.

FIG. 4 illustrates an example of an equivalent circuit of the pixel 101 in FIG. 2 and the signal processing circuit 103 in FIG. 3 and a block diagram. The pixel 101 in the sensor chip 11 includes an APD 201 that is a photoelectric conversion unit or circuit. When light is incident on the APD 201, a charge pair corresponding to the incident light is generated by photoelectric conversion. A voltage VL (a first voltage) is supplied to an anode of the APD 201. A voltage VH (a second voltage) higher than the voltage VL supplied to the anode is supplied to a cathode of the APD 201. Reverse bias voltages are supplied to the anode and the cathode to cause the APD 201 to perform an avalanche multiplication operation. In the above-described voltage supply state, the charge generated by the incident light causes avalanche multiplication, and an avalanche current is generated.

Modes in which the reverse bias voltages are supplied includes a Geiger mode and a linear mode. The Geiger mode is for an operation where a potential difference between the anode and the cathode is a potential difference larger than a breakdown voltage, and the linear mode is for the operation where a potential difference between the anode and the cathode is a potential difference near or equal to or less than the breakdown voltage.

The APD 201 operated in the Geiger mode is referred to as a single-photon avalanche diode (SPAD). For example, the voltage VL (the first voltage) is −30 V, and the voltage VH (the second voltage) is 1 V.

The signal processing circuit 103 in the circuit chip 21 includes a quench element 202, a waveform shaping unit or circuit 210, a photon counter circuit 211, and a selection circuit 212.

The quench element 202 is coupled to a power supply that supplies the voltage VH and to the APD 201. The quench element 202 has the function of converting a change in the avalanche current generated in the APD 201 into a voltage signal. The quench element 202 serves as a load circuit (quench circuit) at the time of signal multiplication by avalanche multiplication and operates to suppress the voltage supplied to the APD 201 to suppress avalanche multiplication (quench operation).

The waveform shaping circuit 210 shapes a potential change in the cathode of the APD 201 obtained during photon detection and outputs a pulse signal. The waveform shaping circuit 210 uses, for example, an inverter circuit or a buffer circuit.

Figure 5A:
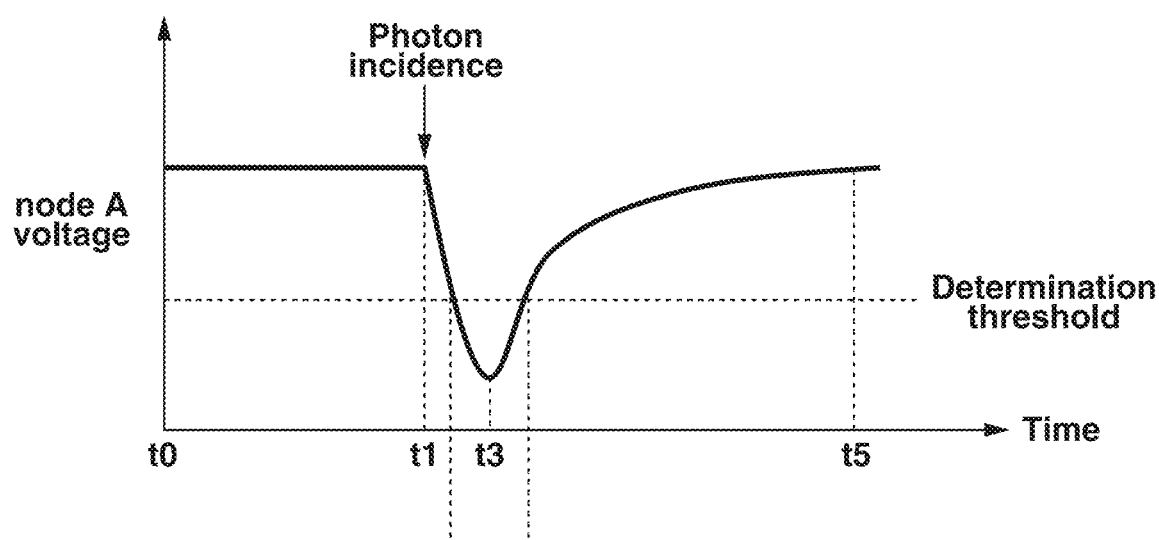
FIGS. 5A and 5B are timing charts illustrating an operation of the photoelectric conversion device.
Figure 5B:
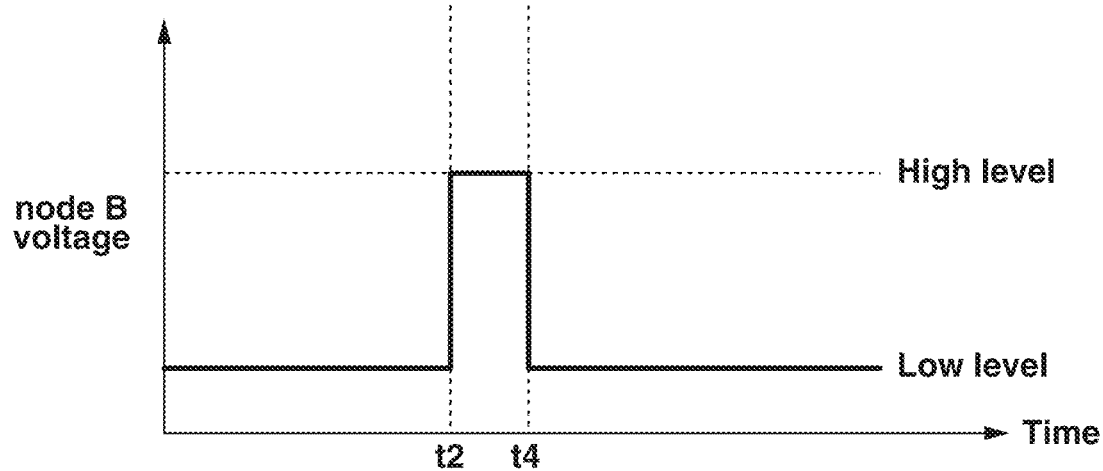

FIGS. 5A and 5B are timing charts illustrating operations of the APD 201 and the waveform shaping circuit 210.

FIG. 5A illustrates voltage changes of a node A in FIG. 4, and FIG. 5B illustrates voltage changes of a node B in FIG. 4.

The voltage from VH to VL is applied to the APD 201 in FIG. 4 from a time t0 to a time t1. During the time period, the voltage of the node B is at a low level. When a photon is incident on the photoelectric conversion circuit 102 at the time t1, an avalanche multiplication current flows through the quench element 202, and the voltage of the node A drops. At a time t2, when the voltage of the node A falls below a predetermined determination threshold, the voltage of the node B changes from a low level to a high level by the function of the waveform shaping circuit 210. At a time t3, when the voltage drop amount becomes larger and the voltage applied to the APD 201 becomes smaller, the avalanche multiplication of the APD 201 stops, and the voltage level of the node A does not drop beyond a certain value. Then, the current flows through the node A to compensate for the voltage drop from the voltage VL, and the voltage rises. At a time t4, when the voltage of the node A exceeds the predetermined determination threshold, the voltage of the node B changes from the high level to the low level by the function of the waveform shaping circuit 210. At a time t5, the node A becomes static at the initial potential level.

Although one photon counter is schematically illustrated for one pixel, some photon counters actually extend across a plurality of pixels. Details will be described below. The photon counter circuit 211 (a first measurement unit or circuit) is a photon counter that measures the number of photons incident on the pixel and counts the pulse signals output from the waveform shaping circuit 210 up to, for example, a first threshold Cx (predetermined upper limit value). The photon counter circuit 211 (photon counter) resets the count value when a predetermined control signal PRES is supplied via the control line (vertical selection line) 213. The photon counter circuit 211 stops the counting operation based on the output of a time-to-digital conversion circuit (TDC) described below. The photon counter circuit 211 includes a TDC circuit (a second measurement unit or circuit) to stop the counting operation. The time photon counter circuit (TDC circuit) measures the time from when the photon counter circuit 211 starts to measure signals output from the pixel until when the measured value (measurement value) reaches the first threshold Cx and outputs the measured time as a pixel value.

In order to solve the issue caused by the TDC circuit (time counter) coupled to only one of the plurality of pixels as described above, it is necessary to avoid saturation of the photon counter circuit 211 before the output of the TDC circuit. Thus, before the output of the TDC circuit, the output value of the photon counter circuit 211 is observed one or more times, and an additional photon counter (extended photon counter circuit) is coupled such that the photon counter circuit 211 coupled to the TDC circuit saturates at the earliest time, whereby it is possible to reduce a frequency of saturation of the photon counter circuit 211 that is not coupled to the TDC circuit. The circuit configuration needed for implementation will be described first, followed by the description of the detailed operation.

Figure 6:
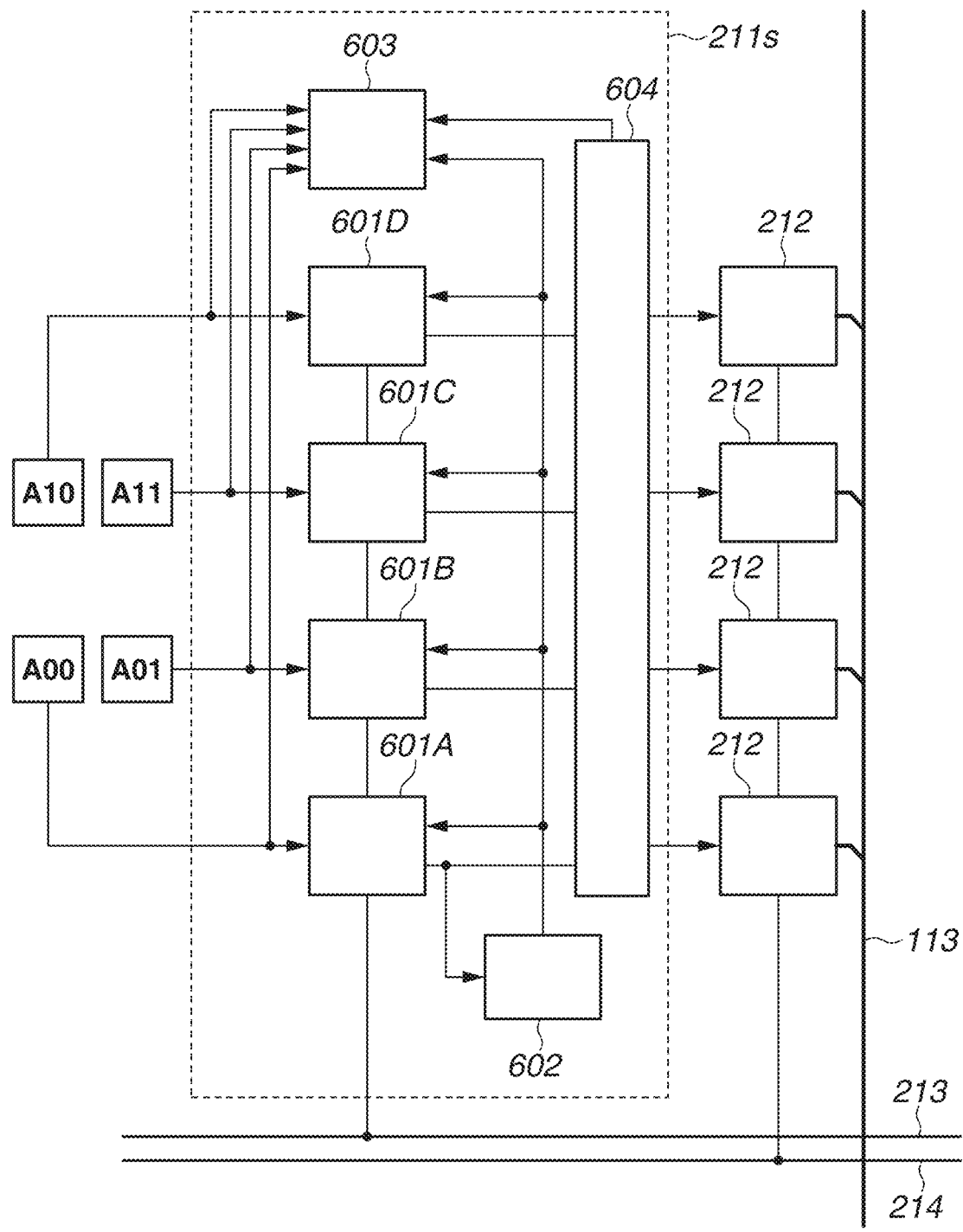
FIG. 6 is a diagram illustrating an example of the sensor chip of the photoelectric conversion device.

FIG. 6 illustrates an example of the detailed arrangement of the photon counter circuit 211 in a unit of a plurality of pixels (partial pixel area). Here, the partial pixel area including a plurality of pixels (e.g., four pixels) is configured as one unit. One shared counter 603, which measures the number of photons incident on any of the plurality of pixels, is provided for each unit of a plurality of photosensitive elements (in this example, A00, A01, A10, and A11) in the same manner as the photon counter circuit 211. The shared counter 603 is coupled exclusively and switchably for each pixel, to receive pulse signals generated by all the photosensitive elements, which are included in the unit of the plurality of photosensitive elements. A measurement value comparison circuit 604 is provided between the photon counter circuit 211 and the selection circuit 212 to switch the electrical coupling between the shared counter 603 and the pixels in the unit of the plurality of photosensitive elements.

Each of the photosensitive elements A00, A01, A10, and A11 includes the sensor chip 11, the quench element 202, and the waveform shaping circuit 210, and the outputs from the photosensitive elements A00, A01, A10, and A11 are coupled to a photon counter circuit group 211s. The photon counter circuit group 211s includes photon counter circuits 601A, 601B, 601C, and 601D (hereinafter simply referred to as "photon counter circuit 601" when the photon counter circuits 601A to 601D are collectively described) provided exclusively for the respective photosensitive elements, which are photon counter circuits 211 in the unit of the plurality of photosensitive elements, the shared counter 603, the measurement value comparison circuit 604, and a TDC circuit 602 that is provided to be coupled to only one photon counter circuit among the photon counter circuits 601 in the photon counter circuit group 211s.

The TDC circuit 602 is provided to be coupled to one photon counter circuit (here, the photon counter circuit 601A) among the photon counter circuits 601 in the photon counter circuit group 211s, which includes the plurality of photon counters, and when the output of the photon counter circuit 601A reaches a certain threshold, shifts the output signal to a high level to stop the counting operation of the photon counter circuit 601 and the time measurement operation of the TDC circuit 602 itself, and when the control signal PRES is supplied via the control line 213, resets the output signal to a low level. The output of the TDC circuit 602 is coupled to the photon counter circuit 601 and the shared counter 603, and when an output signal is at a high level, the counter operation of the photon counter circuit 601 and the shared counter 603 is stopped. The TDC circuit 602 outputs the measurement value of the pixel coupled to the TDC circuit 602 by control signals via the vertical signal line 113 and the vertical selection line 214, simultaneously or instead, outputs the time measurement value measured by the TDC circuit 602. The time measurement value is used for conversion by a photon count value-pixel value restoration circuit that can be coupled at a subsequent stage.

For example, the measurement value comparison circuit 604 refers to, in the output of the photon counter circuit 601, the upper two bits of the photon counter circuits 601A to 601D and, in a timing in which any of the photon counter circuits 601A to 601D indicates [1, 1] (saturation), increases the assignment bit number (upper measurement limit value) of the shared counter 603, which is assigned to a photosensitive element AXX (here, XX is any one of 00, 01, 10, and 11) coupled to the photon counter indicating the saturation, and decreases the assignment bit number assigned to the other photosensitive element that does not indicate saturation. A detailed description of a bit number assignment operation will be given below using a specific example. In a case of reducing the bits assigned to the other photosensitive element, executing the reduction when the value is null is desirable, because it is possible to change the assignment without loss of a counting result. The bits of the shared counter 603 is assigned such that the most significant bit of the photon counter is extended. A photon counting result of a certain photosensitive element is indicated by the output of the photon counter circuit 601 and the shared counter 603, which are coupled to the same photosensitive element. The shared counter 603 includes, for example, a memory circuit that switches a coupling state based on an input signal and maintains the state.

With the above configuration, it is possible to perform control such that the photon counter circuit 601 coupled to the TDC circuit 602 saturates at the earliest time among the unit pixels, which results in an improved possibility of more accurate photon counting of a subject.

The selection circuit 212 switches the electrical coupling and decoupling between the photon counter circuit 211 and the vertical signal line 113, based on the vertical selection signal VSEL supplied from the vertical scanning circuit 110 in FIG. 3 via the control line (vertical selection line) 214. The coupled photon counter circuit 211 transfers the counted measurement value or the time measurement value measured by the TDC circuit 602. Here, the counted measurement value is the counting result including both the photon counter circuit 601 and the shared counter 603 coupled to the same pixel. The selection circuit 212 includes, for example, a buffer circuit that outputs signals.

FIG. 7 is a flowchart of an operation performed by the photoelectric conversion device 100 to prevent saturation of pixels other than the pixel coupled to the TDC circuit 602 when exposure is executed. In step S700, the photon counter circuit 211 starts counting photons in response to a certain operation. In step S701, the shared counter 603 assigns the upper measurement limit value of each photon counter in the initial state. For example, in a case where the shared counter 603 has four bits, one bit may be assigned to each of the four pixels, or all may be decoupled (no assignment).

In step S702, the time counter (the TDC circuit 602) determines whether it is currently a comparison timing. For example, as described above, the upper two bits of the output of each of the photon counter circuits 211 are monitored and, when any pixel is saturated, the TDC circuit 602 determines that the current timing is the comparison timing (YES in step S702) and the processing proceeds to step S703. Alternatively, the TDC circuit 602 can determine that the current timing is the comparison timing, simply after a lapse of a certain time period. In a case where the TDC circuit 602 determines that the current timing is not the comparison timing (NO in step S702), the processing in step S702 is repeatedly performed. In step S703, the measurement value comparison circuit 604 compares output values of the respective photon counter circuits 211. Based on the calculation result in step S703, in step S704, the shared counter 603 changes the coupling state of each photon counter. Then, in step S705, the photon counter continuously counts photons for each unit pixel until the number of measured photons reaches the upper measurement limit value set for each, and when the measurement value of the photon counter coupled to the TDC circuit 602 has reached the upper measurement limit value (the first threshold Cx) (YES in step S705), the processing proceeds to step S706. When the measurement value of the photon counter coupled to the TDC circuit 602 has not reached the upper measurement limit value (the first threshold Cx) (NO in step S705), the processing in step S705 is repeatedly performed. In step S706, each photon counter stops the counting operation of photons and outputs the photon count value and the time measurement value at a time point of the stopping.

In the above-described configuration, the processing proceeds from step S705 to step S706 when the measurement value of the photon counter coupled to the TDC circuit 602 has reached the upper measurement limit value (the first threshold Cx). Alternatively, in addition to the above-describe configuration, the counting operation can be forcibly stopped even without saturation after more than a certain elapsed time (a first predetermined time) from the start of exposure based on the time measurement value of the time counter, and the photon count value and the time measurement value at a time point of the stopping can be output.

By using a specific example, the assignment operation of the shared counter 603 (a third measurement unit or circuit) will be described below. With regard to the plurality of pixels included in the partial pixel area, the shared counter 603 (the third measurement unit) counts the number of photons incident on at least any one pixel. In other words, the photon counter is shared by the plurality of pixels. The shared counter 603 (the third measurement unit) can count the number of photons up to a predetermined value, e.g., eight bits. For example, when the upper measurement limit value of a photon counter corresponding to a certain pixel is exceeded, the bits of the shared counter 603 is previously assigned to the photon counter, and thus it is possible to measure the number of photons beyond a predetermined upper measurement limit value of the photon counter.

Figure 8A:
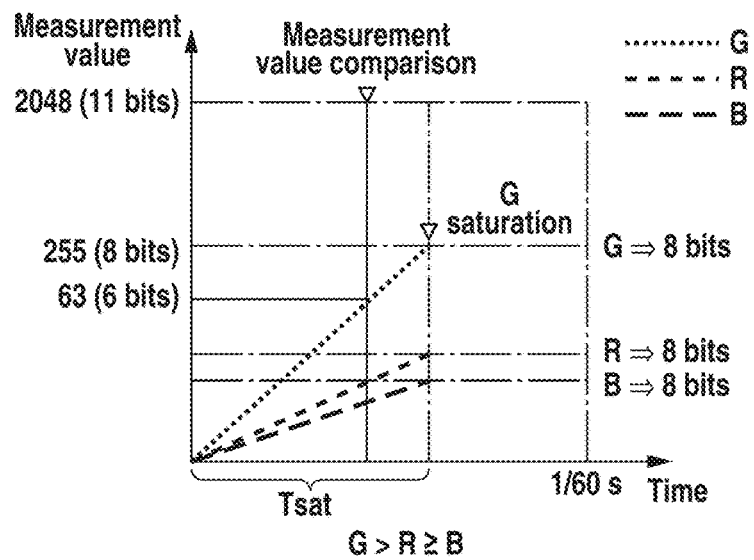
FIGS. 8A to 8C are graphs each illustrating an example of the operation of the photoelectric conversion device.
Figure 8B:
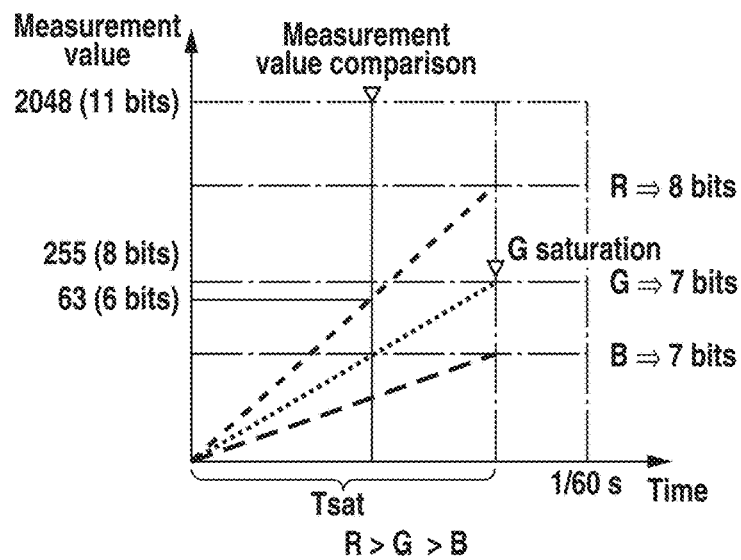
Figure 8C:
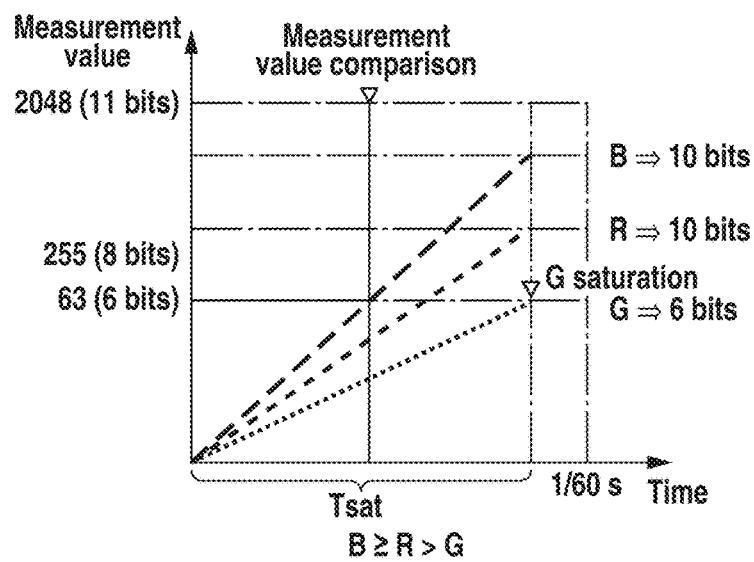

FIGS. 8A to 8C are graphs each illustrating an example of a time lapse and the count number of photons when an exposure is executed. FIG. 9 is a schematic diagram illustrating an example of measurement values of the counters each assigned to a different pixel when the shared counter 603 performs reassignment. A description will be given of an example case where each photosensitive element in FIG. 6 has what is called a color filter, and A00 is a Gb pixel, A01 is a B pixel, A10 is an R pixel, and A11 is a Gr pixel. In FIGS. 8A to 8C, Gr and Gb have substantially the same sensitivity and thus are collectively referred to as G, and the assignment (reduction or addition) of bits are equally executed. Each of the photon counter circuits 601 has six bits and the shared counter 603 has eight bits in total, for example. In the initial state, two bits each of the bits of the shared counter 603 are coupled to the photon counter circuits 601 (the upper section in FIG. 9). That is, in this state, the upper measurement limit value of the photon counter corresponding to each pixel is increased by a predetermined value by the shared counter 603. The TDC circuit 602 is coupled to the photon counter circuit 601A that is coupled to the photosensitive element A00, i.e., the Gb pixel. When the exposure is executed, the upper two bits in the output of each of the photon counter circuits 601 is monitored, and the outputs of the photon counter circuits 601 in the timing of reaching saturation [1, 1] are compared. Based on the result, the coupling state to the shared counter 603 is switched (the lower section in FIG. 9). As illustrated in the lower section of FIG. 9, switching is executed such that the most significant bit of the photon counter circuit 601 coupled to the photosensitive element is extended.

Table 1 illustrates the conditions and examples when the coupling state to the shared counter 603 is switched, and (a), (b), and (c) in Table 1 correspond to FIGS. 8A to 8C, respectively.

TABLE 1

EXAMPLE OF OUTPUT VALUE OF PHOTON COUNTER
AND BIT ASSIGNMENT OF SHARED COUNTER

|  | BIT ASSIGNMENT OF SHARED COUNTER 603 | | |
| --- | --- | --- | --- |
|  | R | G | B |
| (a) G > R ≥ B (G > B ≥ R) | 2 | 2 | 2 |
| (b) R > G > B (B > G > R) | 4 (1) | 1 | 1 (4) |
| (c) R ≥ B > G (B ≥ R > G) | 4 | 0 | 4 |

In the example of FIG. 8A, it can be estimated that the G pixel coupled to the TDC circuit 602 saturates (the measurement value of photons reaches the upper limit value) at the earliest time. Accordingly, it can be estimated that, even without reassignment of the bits of the shared counter 603, the stopping operation of the photon counter for the G pixel by the TDC circuit 602 is performed earlier. Thus, the reassignment of the bits of the shared counter 603 is not executed. In the example of FIG. 8C, G has the lowest count value. In such a case, the bit assignment of the shared counter 603, which is assigned to G, is changed to the assignment to R and B. Thus, a reduction in a counter bit width of G allows the stopping operation of the photon counter of the G pixel by the TDC circuit 602 to be performed earlier, and it is possible to prevent saturation of the pixel that is not coupled to the TDC circuit 602 before the stopping operation of the photon counter of the G pixel by the TDC circuit 602. As a result, the possibility of more accurate photon counting of the subject is improved. In the example of FIG. 8B, it can be estimated that the R pixel saturates earlier than the G pixel, and thus the bit of the shared counter 603 assigned to the G pixel coupled to the TDC circuit 602 is reassigned to the R pixel. In FIG. 8B, unlike in the case of FIG. 8C, the bit assignment of the shared counter 603 coupled to the B pixel indicating the count value less than that of G does not need to be increased.

Table 2 represents the relational inequalities obtained by generalizing the above configuration. For example, when the count value of the photon counter coupled to the TDC circuit 602 is represented as a and the count values of the other photon counters are represented as β and γ, the bits of the shared counter 603 can be assigned as in the inequalities below. A and B are arbitrary integers, and N is the value obtained by dividing the bits of the shared counter 603 by the number of pixels in the unit pixels (e.g., when the shared counter 603 has 8 bits and the unit pixels=4, N=2). The values β and γ are in no particular order. First, the bits are assigned such that the photon counter circuit coupled to the TDC circuit 602 saturates at an earlier time than any of the other photon counter circuits. More preferably, the bits of the shared counter 603 are assigned such that the difference between the photon counter circuits that are not coupled to the TDC circuit 602 is smallest, i.e., the difference between $(2^A)\beta$ and $(2^A)\gamma$ is smallest.

TABLE 2

RELATION BETWEEN OUTPUT VALUE OF PHOTON COUNTER
AND BIT ASSIGNMENT OF SHARED COUNTER

|  | BIT ASSIGNMENT OF SHARED COUNTER | | |
| --- | --- | --- | --- |
|  | α | β | γ |
| $(2^{(-A-B)}\alpha > (2^A)\beta$ AND $(2^{(-A-B)}\alpha > (2^B)\gamma$ | N + A + B | N − A | N − B |

As described above, the coupling state of the shared counter 603 is changed, and then in step S705, the processing waits for the operation of the TDC circuit 602. In step S706, the counter operation is stopped in the timing when the TDC circuit 602 operates, and the exposure operation is terminated. Then, via the selection circuit 212, the control line 214, and the like, the pixel value acquired based on the measurement value of the photon counter or the measurement value of the time counter is output.

According to the present exemplary embodiment, the measurement value comparison circuit 604 is provided for each of the four photosensitive elements (i.e., one partial pixel area), but the measurement value comparison circuit 604 may be provided for all the pixels and the coupling may be switched using the selection circuit 212 and the control line (vertical signal line) 113 and the control line 214. Specifically, the measurement value comparison circuit 604 can be coupled in the same manner as the operations of the vertical and horizontal scanning lines of the pixel output, and the measurement value comparison operation can be performed. In such a case, there is no need to provide the measurement value comparison circuit 604 for each pixel unit, which is advantageous in terms of circuit size.

The bit assignment operation of the shared counter 603 can be executed by referring to, instead of the upper two bits in the output of the photon counter circuit coupled to the TDC circuit 602, all the bits. In such a case, although the circuit size gets larger, it is possible to execute the bit assignment of the shared counter 603 more accurately, and consequently it is superior in terms of a minimum reduction of the image quality due to a reduction in the bit assignment. Alternatively, a configuration can be such that the time is measured separately and the bit assignment is executed after the lapse of a certain time period. This configuration is particularly effective in the method using the vertical and horizontal scanning lines described above, and for example, when the saturation time of the previous frame is used as a certain time period, a reduction in power consumption is expected while maintaining the image quality.

<Image Capturing Device>

Figure 10:
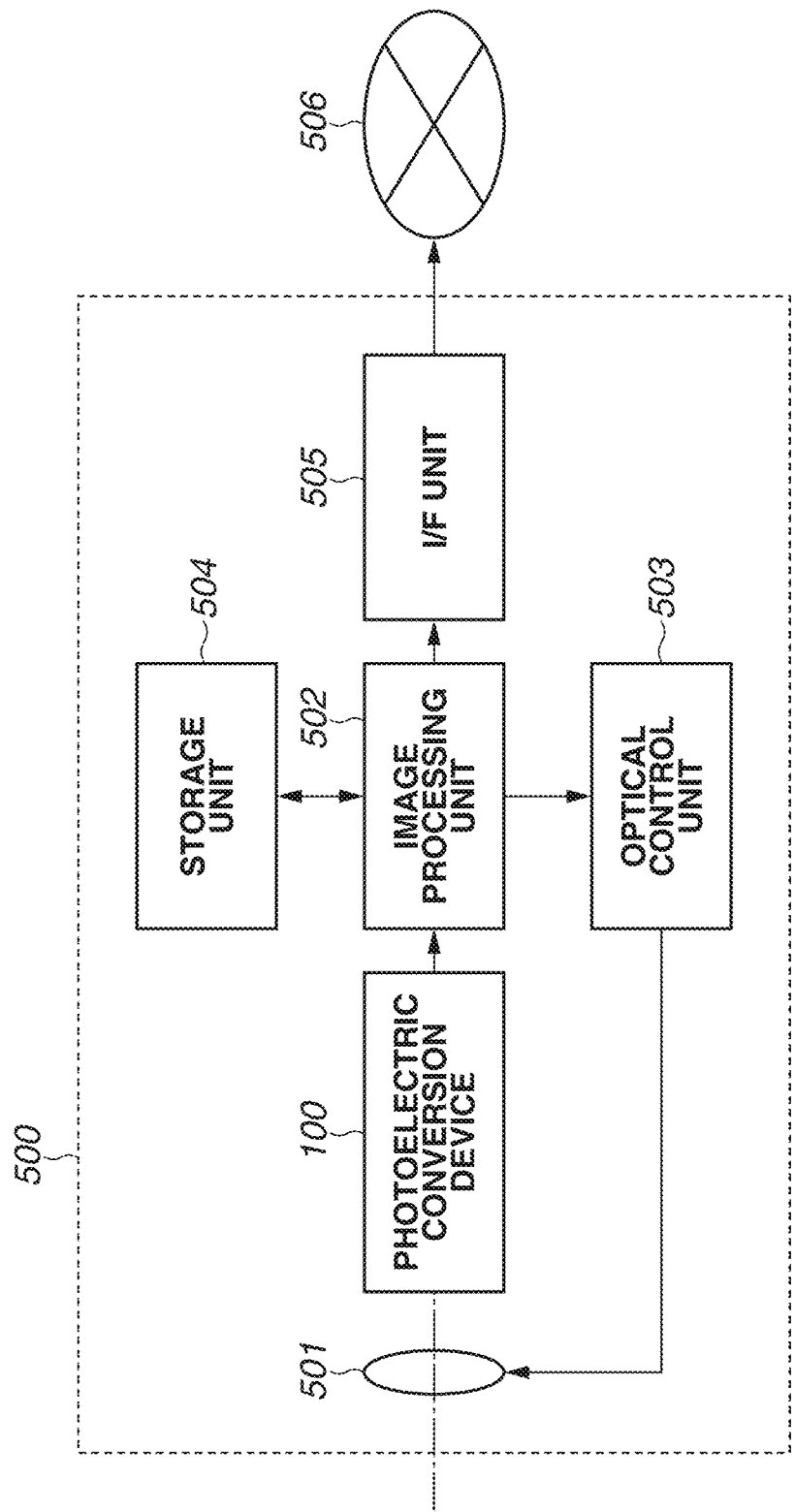
FIG. 10 is a block diagram illustrating a functional configuration example of an image capturing device including the photoelectric conversion device.

FIG. 10 is a block diagram of an image capturing device 500 using the photoelectric conversion device 100.

The image capturing device 500 is for example a digital camera and is an image capturing device including the photoelectric conversion device 100, and includes a lens 501, an image processing unit or circuit 502, an optical control unit or circuit 503, a storage unit or circuit 504, and an interface (I/F) unit or circuit 505 as a communication unit or circuit for wireless communication.

The lens 501 forms an optical image of the subject and causes the formed optical image to be incident on an imaging surface of the photoelectric conversion device 100.

The lens 501 includes a focus lens, a zoom lens, an aperture, and the like. The photoelectric conversion device 100 captures the optical image formed by the lens 501. A signal read out from the photoelectric conversion device 100 is output to the image processing circuit 502. The image processing circuit 502 executes, on the signal output from the photoelectric conversion device 100, processing, such as signal rearrangement, correction of defective pixels, noise reduction, color conversion, white balance correction, gamma correction, or data compression, to generate an image. The image processing circuit 502 has a built-in CPU as a computer and functions as a control unit or circuit that controls operation of each unit of the overall image capturing device 500, based on a computer program stored in the memory as a storage medium. The optical control circuit 503 controls the focus lens, the zoom lens, the aperture, and the like, included in the lens 501. The storage circuit 504 to which a recording medium (not illustrated) is attached stores a video image outputted from the image processing circuit 502 on the recording medium. For example, a memory card is used as the recording medium. A hard disk or the like can also be used as the recording medium. The I/F circuit 505 as a wireless communication circuit outputs the image signal generated by the image processing circuit 502 to the outside of the image capturing device 500. A network 506 includes a plurality of routers, switches, cables, and the like, which satisfy a communication standard such as Ethernet (registered trademark), and the client controls the image capturing device 500 via the network 506.

According to the exemplary embodiment, the application to, for example, a digital camera as an image capturing device is described. However, examples of the image capturing device include electronic devices, and the like, having an image capturing function, such as digital movie cameras, smartphones with cameras, tablet computers with cameras, vehicle-mounted cameras, drone cameras, cameras mounted on robots, and network cameras.

The disclosure has been described in detail based on the desirable exemplary embodiments, but the disclosure is not limited to the above exemplary embodiment, and various modifications can be made based on the gist of the disclosure, which are not excluded from the scope of the disclosure.

A computer program that performs some or all of the control according to the present exemplary embodiment and the functions according to the above exemplary embodiment may be supplied to a photoelectric conversion device, an image capturing device, or the like, via a network or various storage media. The program may be read and executed by a computer (or CPU, MPU, etc.) in the photoelectric conversion device, the image capturing device, etc. In that case, the program and the storage medium storing the program will constitute the disclosure.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-155377, filed Sep. 24, 2021, which is hereby incorporated by reference herein in its entirety.

What is claimed is:

1. A photoelectric conversion device having a pixel including a photoelectric conversion circuit configured to output a signal in response to incidence of a photon, the photoelectric conversion device comprising:
   a first measurement circuit configured to measure the signal output from the pixel;
   a second measurement circuit configured to measure a time from when the first measurement circuit starts to measure the signal until when a measurement value of the first measurement circuit reaches a first threshold; and
   a change circuit configured to change, for at least one of a plurality of the pixels, an upper measurement limit value up to which the signal is countable,
   wherein the change circuit increases the upper measurement limit value of the pixel corresponding to the first measurement circuit having the largest measurement value among a plurality of the first measurement circuits.

2. The photoelectric conversion device according to claim 1, wherein the change circuit determines, based on the measurement value of the first measurement circuit, the pixel of which the upper measurement limit value is to be changed.

3. The photoelectric conversion device according to claim 1, wherein the change circuit increases the upper measurement limit value for the pixel corresponding to the first measurement circuit having obtained a measurement value reached the first threshold.

4. The photoelectric conversion device according to claim 1, further comprising:
   a third measurement circuit configured to count the signal for at least one of a plurality of the pixels included in a partial pixel area,
   wherein the change circuit associates the third measurement circuit with any of the plurality of the pixels to change the upper measurement limit value.

5. The photoelectric conversion device according to claim 4, wherein the third measurement circuit counts the signal up to a predetermined upper limit value for each of the plurality of the pixels included in the partial pixel area.

6. The photoelectric conversion device according to claim 5, wherein the change circuit determines, based on the measurement values of a plurality of the first measurement circuits each corresponding to a different pixel among the plurality of the pixels included in the partial pixel area, the pixel of which the predetermined upper limit value is to be changed.

7. The photoelectric conversion device according to claim 6, wherein the change circuit compares measurement values of a plurality of the first measurement circuits each corresponding to a different pixel among the plurality of the pixels included in the partial pixel area and changes the upper measurement limit value of the third measurement circuit for the pixel corresponding to the first measurement circuit of which the measurement value is larger.

8. The photoelectric conversion device according to claim 4, further comprising an output circuit configured to output the measurement value of the first measurement circuit, a measurement value of the second measurement circuit, or a measurement value of the third measurement circuit.

9. The photoelectric conversion device according to claim 8, wherein the output circuit outputs, among measurement values of a plurality of the first measurement circuits each corresponding to a different pixel among the plurality of the pixels, the measurement values of the first measurement circuits excluding the first measurement circuit that has reached the first threshold and the measurement value of the second measurement circuit.

10. The photoelectric conversion device according to claim 8, wherein the output circuit combines, as one signal, the measurement value of the first measurement circuit and the measurement value of the second measurement circuit included in the partial pixel area including the plurality of the pixels and outputs the one signal.

11. The photoelectric conversion device according to claim 1,
wherein the second measurement circuit is provided for each partial pixel area including the plurality of the pixels having different spectral sensitivities from each other, and
wherein the first measurement circuit is provided for each of the plurality of the pixels included in the partial pixel area.

12. The photoelectric conversion device according to claim 1, further comprising a signal restoration circuit configured to restore a pixel signal based on the measurement values of a plurality of the first measurement circuits each corresponding to a different pixel among the plurality of the pixels or a measurement value of a time of the second measurement circuit.

13. The photoelectric conversion device according to claim 1, wherein the photoelectric conversion circuit includes an avalanche photodiode configured to detect incidence of a photon.

14. An image capturing device comprising the photoelectric conversion device according to claim 1.

15. A control method for controlling a photoelectric conversion device, the photoelectric conversion device including:
a pixel including a photoelectric conversion circuit configured to output a signal in response to incidence of a photon;
a first measurement circuit configured to measure the signal output from the pixel; and
a second measurement circuit configured to measure a time from when the first measurement circuit starts to measure the signal until when a measurement value of the first measurement circuit has reached a first threshold,
the control method comprising changing, for at least one of a plurality of the pixels, an upper measurement limit value up to which the signal is countable,
wherein the changing includes increasing the upper measurement limit value of the pixel corresponding to the first measurement circuit having the largest measurement value among a plurality of the first measurement circuits.

16. A non-transitory storage medium causing a computer included in a photoelectric conversion device to implement a control method for controlling the photoelectric conversion device, the photoelectric conversion device including:
a pixel including a photoelectric conversion circuit configured to output a signal in response to incidence of a photon;
a first measurement circuit configured to measure the signal output from the pixel; and
a second measurement circuit configured to measure a time from when the first measurement circuit starts to measure the signal until when a measurement value of the first measurement circuit has reached a first threshold, and
the control method including changing, for at least one of a plurality of the pixels, an upper measurement limit value up to which the signal is countable,
wherein the changing includes increasing the upper measurement limit value of the pixel corresponding to the first measurement circuit having the largest measurement value among a plurality of the first measurement circuits.

* * * * *